(12) United States Patent
Behelfer et al.

(10) Patent No.: US 8,221,105 B2
(45) Date of Patent: Jul. 17, 2012

(54) SYSTEM FOR HOT ASPHALT COOLING AND PELLETIZATION PROCESS

(75) Inventors: Gary L. Behelfer, Houston, TX (US); Maury Schlossman, Katy, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 0 days.

(21) Appl. No.: 13/110,137

(22) Filed: May 18, 2011

(65) Prior Publication Data

US 2011/0217403 A1    Sep. 8, 2011

Related U.S. Application Data

(63) Continuation of application No. 12/112,084, filed on Apr. 30, 2008, now Pat. No. 7,968,020.

(51) Int. Cl.
*B29B 9/16* (2006.01)
(52) U.S. Cl. ........... 425/8; 425/6; 425/10; 264/5; 264/6; 264/8; 264/11; 208/22; 208/23; 208/39
(58) Field of Classification Search ............... 264/5–6, 264/8, 11; 208/22–23, 39; 425/6, 8, 10
See application file for complete search history.

(56) References Cited

U.S. PATENT DOCUMENTS

| | | | |
|---|---|---|---|
| 2,616,837 A | 11/1952 | Roediger | |
| 2,627,498 A | 2/1953 | Fink et al. | |
| 2,859,183 A | 11/1958 | Ashley | |
| 2,861,939 A | 11/1958 | Biribauer et al. | |
| 2,889,296 A | 6/1959 | Morris et al. | |
| 2,944,986 A | 7/1960 | Powell et al. | |
| 3,015,128 A | 1/1962 | Somerville | |
| 3,249,657 A | 5/1966 | Russo | |
| 3,265,779 A | 8/1966 | Gobla et al. | |
| 3,310,612 A | 3/1967 | Somerville | |
| 3,360,455 A | 12/1967 | Corbett et al. | |
| 3,461,489 A | 8/1969 | Tuttle | |
| 3,462,359 A | 8/1969 | Fauber | |
| 3,598,716 A | 8/1971 | Fauber | |
| 3,607,993 A | 9/1971 | Tuttle | |
| 3,673,298 A | 6/1972 | Miller | |

(Continued)

FOREIGN PATENT DOCUMENTS

CA    2069515    11/1993

OTHER PUBLICATIONS

Incropera, F.P. et al. (1996). Fundamentals of the Heat and Mass Transfer, 4th Ed., Wiley, 888 pgs (Office Action cites pgs 374 & 375).

*Primary Examiner* — Walter D Griffin
*Assistant Examiner* — Brian McCaig
(74) *Attorney, Agent, or Firm* — KBR IP Legal Dept.

(57) ABSTRACT

Systems for pelletizing hot asphaltenes are provided. Asphaltenic hydrocarbons can be dispersed to provide two or more asphaltenic particles. The asphaltenic hydrocarbons can be at a temperature of from about 175° C. to about 430° C. The asphaltenic particles can be contacted with a film of cooling medium. The film can have a thickness of from about 1 mm to about 500 mm. At least a portion of the asphaltenic particles can be solidified by transferring heat from the asphaltenic particles to the cooling medium to provide solid asphaltenic particles. The solid asphaltenic particles can be separated from at least a portion of the cooling medium.

19 Claims, 1 Drawing Sheet

U.S. PATENT DOCUMENTS

| | | |
|---|---|---|
| 3,751,278 A | 8/1973 | Alexander |
| 3,779,892 A | 12/1973 | Forster et al. |
| 3,847,751 A | 11/1974 | Godino et al. |
| 3,868,315 A | 2/1975 | Forster et al. |
| 3,877,918 A | 4/1975 | Cerbo |
| 3,935,093 A | 1/1976 | Senolt et al. |
| 3,989,616 A | 11/1976 | Pagen et al. |
| 3,996,026 A | 12/1976 | Cole |
| 4,001,091 A | 1/1977 | Senolt et al. |
| 4,024,210 A | 5/1977 | Chalmers |
| 4,028,447 A * | 6/1977 | Talbert ............... 264/8 |
| 4,052,290 A | 10/1977 | Cushman et al. |
| 4,052,492 A | 10/1977 | Kontny et al. |
| 4,123,206 A | 10/1978 | Dannelly |
| 4,207,117 A | 6/1980 | Espenscheid et al. |
| 4,218,409 A | 8/1980 | Dannelly |
| 4,283,230 A | 8/1981 | Clementoni et al. |
| 4,303,433 A | 12/1981 | Torobin |
| 4,332,671 A | 6/1982 | Boyer |
| 4,386,895 A | 6/1983 | Sodickson |
| 4,526,588 A | 7/1985 | Lusch et al. |
| 4,657,702 A | 4/1987 | Vasconcellos et al. |
| 4,681,700 A | 7/1987 | Vasconcellos et al. |
| 4,684,336 A | 8/1987 | Brotz |
| 4,769,288 A | 9/1988 | Saylak |
| 4,931,231 A | 6/1990 | Teppo |
| 4,933,067 A | 6/1990 | Rankel |
| 4,950,307 A | 8/1990 | Najjar et al. |
| 4,975,176 A | 12/1990 | Begliardi et al. |
| 5,046,559 A | 9/1991 | Glandt |
| 5,215,146 A | 6/1993 | Sanchez |
| 5,228,977 A | 7/1993 | Moran et al. |
| 5,318,124 A | 6/1994 | Ong et al. |
| 5,320,739 A | 6/1994 | Moran et al. |
| 5,628,937 A | 5/1997 | Oliver et al. |
| 5,637,350 A | 6/1997 | Ross |
| 5,932,186 A | 8/1999 | Romine et al. |
| 5,939,474 A | 8/1999 | Gooswilligen et al. |
| 6,062,487 A | 5/2000 | Bedetti |
| 6,331,245 B1 | 12/2001 | Moretta et al. |
| 6,332,975 B1 | 12/2001 | Abdel-Halim et al. |
| 6,357,526 B1 | 3/2002 | Abdel-Halim et al. |
| 6,361,682 B1 | 3/2002 | Moretta et al. |
| 6,499,979 B2 | 12/2002 | Northup, Jr. et al. |
| 7,101,499 B1 | 9/2006 | Bronicki et al. |

* cited by examiner

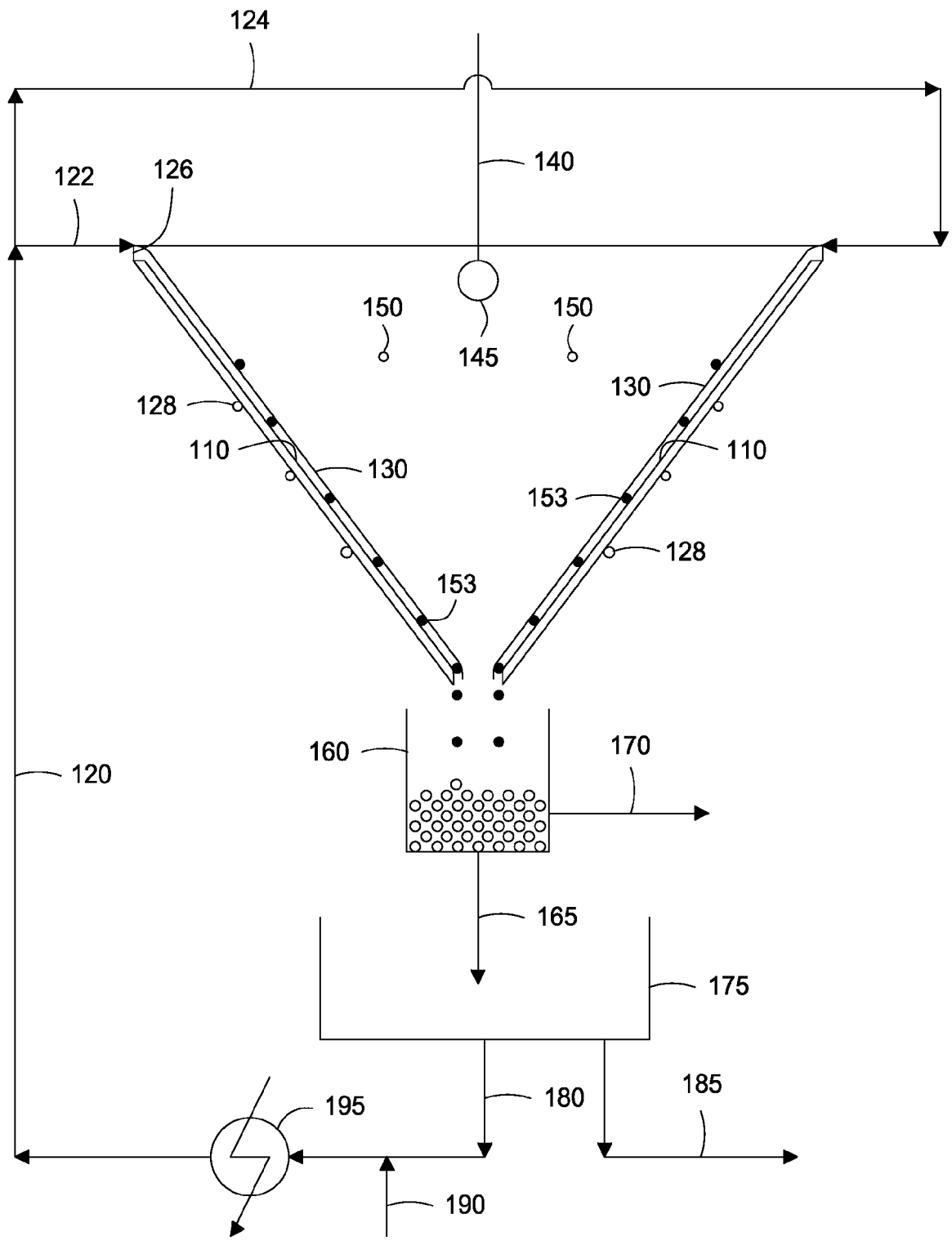

SYSTEM FOR HOT ASPHALT COOLING AND PELLETIZATION PROCESS

CROSS-REFERENCE TO RELATED APPLICATIONS

This application is a continuation of U.S. patent application Ser. No. 12/112,084, now U.S. Pat. No. 7,968,020, filed on Apr. 30, 2008, the entirety of which is incorporated by reference herein.

BACKGROUND

1. Field

The present embodiments generally relate to systems and methods for cooling and solidifying asphaltenes.

2. Description of the Related Art

Heavy hydrocarbons, such as high molecular weight, viscous, non-Newtonian fluids are produced during extraction and refining processes. Such heavy hydrocarbons typically require upgrading prior to transport. Often, one or more solvents such as diesel fuel are used to reduce the viscosity and improve the pumpability and facilitate the transport of heavy hydrocarbons. Alternatively, heavy hydrocarbons can be deasphalted using one or more deasphalting processes such as the Residuum Oil Supercritical Extraction ("ROSE®") treatment process. Using the ROSE treatment process, the heavy hydrocarbons are introduced to a solvent extraction process wherein high viscosity asphaltenes and resins ("asphaltenic hydrocarbons") are separated and removed, providing a low viscosity deasphalted oil. Similar asphaltenic hydrocarbons can be generated during heavy hydrocarbon refining processes. While generated using two different processes, i.e. solvent extraction and/or refining, the asphaltenic hydrocarbons share similar characteristics. Both are heavy molecular weight hydrocarbons, which at ambient temperatures are solid or semi-solid, both require elevated temperatures to maintain pumpability, and both require upgrading to provide one or more fungible products.

Where local upgrading facilities are unavailable or capacity limited, the asphaltenic hydrocarbons must be transported via truck, rail, or pipeline to one or more remote upgrading facilities. Asphaltenic hydrocarbons are often maintained at elevated temperatures to permit loading and unloading of the liquid or semi-solid asphaltenic hydrocarbons to/from truck, rail, and/or pipeline. The need to maintain the asphaltenic hydrocarbons at elevated temperatures throughout transport increases cost, complicates the process, and risks solidification of the asphaltenic hydrocarbons should the temperature decrease to a temperature at which the asphaltenic hydrocarbons solidify. Solidified asphaltenic hydrocarbons can plug pipelines and require extensive maintenance and/or cleaning of pipelines, trucks, and rail transport wagons. As an alternative to fluid or semi-solid transport, the asphaltenic hydrocarbons can be cooled in bulk and solidified prior to transport. However, bulk solidification, loading, transport, and unloading of bulk solidified materials can be cost, labor, and maintenance intensive.

To minimize special equipment and/or handling requirements, the asphaltenic hydrocarbons can alternatively be solidified into smaller particles or pellets prior to transport. Various methods for pelletizing heavy hydrocarbons have been developed. For example, U.S. Pat. No. 7,101,499 describes a process where molten heavy hydrocarbons can be formed into a series of drops which fall into a bath of coolant beneath the hydrocarbon distributor. Alternatively, U.S. Pat. Nos. 6,331,245, 6,361,682, and 6,499,979 describe one or more wetted pelletizers which provide relatively uniform heavy hydrocarbon solids by "spraying" a molten asphaltenic hydrocarbon through a rotary head to form a plurality of hydrocarbon droplets. The individual hydrocarbon droplets forming the "spray" can "skin" over while in flight, solidifying into hydrocarbon pellets as they impact and flow down the walls of the wetted pelletizer into an underlying cooling fluid bath. The usefulness of the cooling bath or the wetted pelletizer is limited, however, based upon the variable specific gravity of the hydrocarbon pellets, which can range from less than water (i.e. a specific gravity of less than 1.0 or an API density of greater than 10°) to greater than water (i.e. a specific gravity of greater than 1.0 or an API density of less than 10°). The formation of both floating and sinking hydrocarbon pellets within the cooling fluid reservoir makes the separation and removal of the pellets difficult since the floating pellets tend to agglomerate forming large masses, which are not amenable to removal from the cooling fluid reservoir particularly where the reservoir is located within an enclosed vessel.

There is a need therefore, for improved systems for pelletizing heavy hydrocarbons.

BRIEF DESCRIPTION OF THE DRAWING

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The FIGURE (also referred to as FIG. 1) depicts an illustrative system for processing a heavy hydrocarbon according to one or more embodiments described.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily. all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Systems for pelletizing heavy hydrocarbons, such as asphaltenes, are provided. In at least one specific embodiment, hot asphaltenes can be dispersed into two or more particles. The particles can be contacted with a moving film of cooling medium having a thickness of from about 1 mm to about 500 mm. At least a portion of the particles can be solidified by transferring heat from the particles to the cooling medium to provide solid asphaltenic particles. In one or more embodiments, the solid asphaltenic particles can be separated from the cooling medium and recovered as cooled, solid particles.

The cooling medium ("heat transfer fluid") can include one or more fluids. In one or more embodiments, the cooling medium can include one or more aqueous fluids, such as water and/or brine solutions. In one or more embodiments, the one or more aqueous fluids can contain one or more corrosion inhibitors, biocides, surfactants, or any combination thereof. In one or more embodiments, the cooling medium can include one or more $C_5$ to $C_9$ paraffinic hydrocarbons. The temperature of the cooling medium can range from about 0° C. to about 95° C. The type and temperature of the cooling medium can be selected to provide a sufficient rate of heat transfer from the particles to the cooling medium. The depth of the film of cooling medium can be either fixed or variable. The depth of the film of cooling medium can vary from about 1 mm to about 500 mm, and can also be varied to provide the desired rate of heat transfer to cool the asphaltenic particles. In one or more embodiments, one or more drains can be used to adjust the depth of the cooling medium.

The one or more heat transfer units 195 can include any system, device, or combination of systems and/or devices suitable for adjusting the temperature of the cooling medium in line 180 to provide recycled cooling medium via line 120 at a predetermined temperature. The one or more heat transfer units 195 can include one or more U-tube exchangers, shell-and-tube exchangers, plate and frame exchangers, spiral wound exchangers, fm-fan exchangers, evaporative coolers, or any combination thereof. The operating temperature of the one or more heat transfer units 195 can range from about 0° C. to about 90° C., from about 20° C. to about 75° C., or from about 30° C. to about 60° C. The operating pressure of the one or more heat transfer units 195 can range from about 101 kPa to about 2,160 kPa, from about 300 kPa to about 1,820 kPa, or from about 500 kPa to about 1,475 kPa.

In one or more embodiments, primary cooling of the asphaltenic particles can occur by contacting the particles with the film of cooling medium. Heat can be transferred from the particles to the cooling medium to provide a plurality of cooled and/or solidified asphaltenic particles ("solid asphaltenic particles"). In one or more embodiments, a portion of the heat in the particles can be removed by passing the particles through or otherwise contacting the particles with a mist of cooling medium prior to contacting the particles with the film of cooling medium. The cooling rate of the particles while contacting the film of cooling medium can range from about 1° C./sec to about 100° C./sec. The residence time of the asphaltenic particles in the cooling medium film can range from about 0.1 seconds to about 90 seconds.

In one or more embodiments, the cooled particles can be transported in slurry form or can be optionally dried and transported in dry form. In one or more embodiments, at least a portion of the recovered cooling medium can be recycled to provide at least a portion of the film of cooling medium and/or cooling medium mist. The temperature of the recovered cooling medium can be adjusted using a cooler or other heat exchanging device to provide a recycled and/or make-up cooling medium having a temperature within a desired temperature range.

As used herein, the terms "asphaltene," "asphaltenes," "asphaltenic," and "asphaltenic hydrocarbons," are used interchangeably and refer to a hydrocarbon mixture containing one or more heavy hydrocarbons that are insoluble in light, paraffinic, straight-chain, solvents such as pentane and heptane, but are soluble in aromatic compounds such as benzene and toluene. The heavy hydrocarbons can include one or more aromatic and/or naphthenic compounds containing an average of 70 to 80 carbon, nitrogen, sulfur, and oxygen atoms.

As used herein, the terms "solid asphaltenic particles," "solid asphaltene particles", and "solid particles" can refer collectively to any of the following: solid asphaltene particles, semi-solid asphaltene particles, and composite asphaltene particles having a solid asphaltene 'skin' surrounding a molten asphaltene 'core.'

So that the recited features of the present invention can be understood in more detail, the FIGURE depicts an illustrative system for processing a heavy hydrocarbon according to one or more embodiments. The illustrative system can include one or more surfaces 110, fluid distributors 126, hydrocarbon distributors 145, separators 160, reservoirs 175, and heat transfer units 195.

The heavy hydrocarbon, such as asphaltenes, can be introduced via line 140 to the one or more hydrocarbon distributors 145 to provide two or more particles 150. The temperature of the asphaltenes in line 140 can range from about 175° C. to about 430° C., from about 175° C. to about 370° C., or from about 175° C. to about 315° C. The pressure of the molten asphaltenes in line 140 can vary greatly and will depend on the upstream processing requirements. The pressure can be about atmospheric pressure, and can range from about 101 kPa to about 2,160 kPa, about 300 kPa to about 1,820 kPa, or from about 500 kPa to about 1,475 kPa.

The one or more hydrocarbon distributors 145 can be any system or device capable of dispersing a molten heavy hydrocarbon into discrete particles. The distributor 145 can include, for example, one or more rotating heads each having one or more orifices formed therethrough. The orifice count, diameter, speed, and/or rotation of the distributor 145 can be used to control and/or adjust the size and/or shape of the particles 150. Properties of the molten asphaltenes in line 140, including but not limited to, temperature, density, viscosity, and surface tension can also contribute to the size and/or shape of the asphaltenic particles 150.

In one or more embodiments, the distributor 145 can include, but is not limited to a tapered basket or a multiple diameter head design. The orifices disposed about the distributor 145 can be evenly spaced about the circumference of the distributor 145 in one or more rows, in triangular or square pitch, or any other uniform or non-uniform arrangement. The orifice diameter can be varied from about 0.5 mm; about 0.8; or about 1.0 mm; to about 20 mm; about 25 mm; or about 50 mm to produce any desired particle diameter and/or size distribution. The combination of distributor 145 dimensions, rotational speed, orifice size, and fluid temperature (viscosity) can control particle diameter and size distribution, molten asphaltene throughput per orifice, and throw length of the particles 150. As the molten asphaltenes enter the distributor 145, centrifugal and/or gravitational force within the distributor 145 can discharge a plurality of molten asphaltene cylinders into the free space surrounding the distributor 145. The asphaltene cylinders can break up in flight to form spherical particles 150 as the surface tension force overcomes the combined viscous and inertial forces.

In at least one specific embodiment, the head diameter of the hydrocarbon distributor 145 can range from about 5 cm to about 150 cm. The orifice size in the hydrocarbon distributor can range from about 0.1 mm to about 12.7 mm. The rotational speed of the hydrocarbon distributor 145 can range from about 100 RPM to about 10,000 RPM, from about 150 RPM to about 7,500 RPM, or from about 200 RPM to about 5,000 RPM. The throw length of the hydrocarbon distributor 145 can range from about 0.3 m to about 4.6 m, from about 0.6 m to about 3.8 m, or from about 0.6 m to about 3.0 m. The diameter of the asphaltenic particles 150 can range from about 0.1 mm to about 12.7 mm, from about 0.5 mm to about 10 mm, or from about 1 mm to about 10 mm.

The particles 150 can be thrown, dropped, or otherwise expelled from the distributor 145 toward a film 130 of cooling medium that is disposed on a first side of the surface 110. The surface 110 can be inclined, sloped, or angled relative to the horizontal. The surface 110 can also define an open ended container or receptacle. In one or more embodiments, the surface 110 can be formed into a hollow geometric shape. Illustrative geometric shapes can include, but are not limited to, an inverted cone, i.e. a cone with the apex pointed downward, away from the fluid distributor 126 as shown in the FIGURE, an upright cone, i.e. a cone with the apex pointed upward toward the fluid distributor 126, a cylinder, an upright hemisphere, or inverted hemisphere. In one or more embodiments, the temperature of the surface 110 can be adjusted and/or controlled using one or more external coolants circulated through a series of fluid conduits 128 disposed on a second side of the surface 110 opposite the first side.

The surface 110 can be fabricated from any metal an/or metal alloy, including, but not limited to, steel, aluminum, stainless steel, brass, bronze or any other metal and/or metal alloy resistant to any corrosive effect of the cooling medium and hydrocarbons. In one or more embodiments, one or more coatings, for example a Teflon® or similar non-stick coating, can be applied to the surface 110 to minimize the adhesion of the particles 150 to the surface 110. In one or more embodiments, the surface 110 can be fabricated from a non-metallic rigid material, such as plastic or cement. The thickness of the surface 110, including any optional coating, can range from about 1.6 mm to about 100 mm, from about 1.6 mm to about 50 mm, from about 1.6 mm to about 25 mm, from about 1.6 mm to about 12.5 mm, or about 1.6 mm to about 6.25 mm. In one or more embodiments, the surface 110 can be modified with ridges of one or more shapes to improve, control, or otherwise influence the thickness and/or velocity of the film 130.

The cooling medium film 130 can be evenly or unevenly distributed via lines 122, 124 across the surface 110 using one or more fluid distributors 126. Each fluid distributor 126 can be a weir, nozzle, or other device capable of delivering the film 130 of cooling medium to the surface 110. As mentioned above, the surface 110 is angled relative to the horizontal. As such, the cooling medium film 130 can flow across the surface 110 to the separator 160. The flow regime of the cooling medium can be laminar, transitional, or turbulent, i.e. having any Reynolds number. In one or more specific embodiments, the cooling medium film 130 flowing across the surface 110 can be in a laminar flow regime, having a Reynolds number of less than 4,000. In one or more specific embodiments, the cooling medium film 130 flowing across the surface 110 can be in a turbulent flow regime, having a Reynolds number greater than 4,000.

The film 130 thickness can range from about 1 mm to about 500 mm. In one or more embodiments, the film 130 thickness can range from about 1 mm to about 250 mm. In one or more embodiments, the film 130 thickness can range from about 1 mm to about 125 mm. In one or more embodiments, the film 130 thickness can range from a low of about 2 mm, 6 mm, or 15 mm to a high of about 125 mm, 350 mm, or 500 mm. In one or more embodiments, the film 130 thickness can range from a low of about 2 mm, 10 mm, or 15 mm to a high of about 25 mm, 55 mm, or 105 mm.

In one or more embodiments, the velocity of the cooling medium film 130 across the surface 110 can range from about 0.1 m/sec to about 10 m/sec, from about 0.2 m/sec to about 7 m/sec, or from about 0.3 m/sec to about 5 m/sec. In one or more embodiments, the velocity of the cooling medium film 130 across the surface 110 can range from about 0.05 m/sec to about 8 m/sec, from about 0.1 m/sec to about 6 m/sec, or from about 0.3 m/sec to about 4 m/sec. In one or more embodiments, the velocity of the cooling medium film 130 across the surface 110 can range from a low of about 0.03 m/sec, 0.05 m/sec, or 1.0 m/sec to a high of about 3.0 m/sec, 5 m/sec, or 10 m/sec.

The cooling medium in line 120 can include one or more fluids. In one or more embodiments, the cooling medium in line 120 can include one or more aqueous fluids, such as water and/or brine solutions. In one or more embodiments, the one or more aqueous fluids can contain one or more corrosion inhibitors, biocides, surfactants, or any combination thereof. In one or more embodiments, the cooling medium can include one or more $C_5$ to $C_9$ paraffins, or mixtures thereof. The temperature of the cooling medium in line 120 can range from about 0° C. to about 100° C., from about 0° C. to about 75° C., or from about 0° C. to about 50° C., depending on the heat requirements of the system.

While traveling from the hydrocarbon distributor 145 to the surface 110, the asphaltenic particles can begin to externally cool, forming a "skin" on the outside of the asphaltenic particles 150. The asphaltenic particles 150 can be further cooled by providing a mist of cooling medium (not shown) between the hydrocarbon distributor 145 and the surface 110 through which the asphaltenic particles 150 can pass. The asphaltenic particles 150 can contact the cooling medium film 130 disposed on a first side of the surface 110. The cooling medium film 130 can cool and solidify the asphaltenic particles 150 to provide a plurality of solid asphaltenic particles 153.

The cooling rate of the solid asphaltenic particles 153 can be controlled by adjusting the temperature of the cooling medium film 130. The flowrate of the cooling medium film 130 can be adjusted to provide a desired residence time for the solid asphaltenic particle 153 to be in contact with the cooling medium film 130. In one or more embodiments, supplemental temperature control of the surface 110 can be provided using one or more heat exchange fluids circulated via the one or more fluid conduits 128 in contact with the second side of the surface 110. In one or more embodiments, the cooling rate of the solid asphaltenic particles 153 can range from about 1° C./sec to about 100° C./sec, from about 1° C./sec to about 75° C./sec, or from about 1° C./sec to about 50° C./sec. In one or more embodiments, the residence time of the solid asphaltenic particles 153 can be in contact with the cooling medium film 130 can range from about 0.1 seconds to about 180 seconds, from about 0.1 seconds to about 120 seconds, from about 0.1 seconds to about 60 seconds, or from about 0.1 seconds to about 30 seconds.

The solid asphaltenic particles 153 and the cooling medium film 130 can flow from the surface 110 to one or more separators 160. In one or more embodiments, the one or more separators 160 can separate the plurality of solid asphaltenic particles 153 from at least a portion of the cooling medium, permitting withdrawal of a slurry containing the plurality of solid asphaltenic particles 153 and a portion of the cooling medium via line 170, and recovered cooling medium via line 165. The recovered cooling medium in line 165 can be stored in one or more reservoirs 175.

In one or more embodiments, the solid asphaltenic particles 153 can be removed from the separator 160 in bulk via mechanical transfer, e.g. shovels, bucket lift, or conveyor. In one or more embodiments, the solid asphaltenic particles 153 can be removed from the separator 160 as a solids-rich slurry via one or more pumps, not shown. Alternatively, slurried asphaltenic particles 153 removed via line 170 can be dehydrated and transported in dry form. The solids content of the slurry removed via line 170 can range from about 30% wt to about 95% wt, from about 40% wt to about 90% wt, or from about 50% wt to about 80% wt. The temperature of the solid asphaltenic particles 153 removed via line 170 can range from about 10° C. to about 90° C., from about 20° C. to about 75° C., or from about 30° C. to about 60° C.

The separator 160 can include any system, device, or combination of systems and/or devices suitable for separating at least a portion of the cooling medium from the solid asphaltenic particles 153 to provide the slurry via line 170 and recovered cooling medium via line 165. In one or more embodiments, the one or more separators 160 can include, but are not limited to, one or more strainers, basket filters, dewatering conveyors, recessed chamber filter presses, vibrating screens, oscillating screens, or any combination thereof, arranged in series and/or parallel. The operating temperature of the one or more separators 160 can range from about 10° C. to about 90° C., from about 20° C. to about 75° C., or from about 30° C. to about 60° C.

In one or more embodiments, at least a portion of the cooling medium within the reservoir 175 can be removed and treated for discharge and/or disposal via line 185. In one or more embodiments, at least a portion of the cooling medium within the reservoir 175 can be recycled via line 180 to provide at least a portion of the cooling medium forming the cooling medium film 130 on the first side of the surface 110. In one or more embodiments, a minimum of 25% wt, 50% wt, 75% wt, 85% wt, 90% wt, 95% wt, or 99% wt of the cooling medium introduced to the reservoir 175 via line 165 can be recycled via line 120.

In one or more embodiments, the temperature of at least a portion of the cooling medium recycled via line 120 can be adjusted using one or more heat transfer units 195. In one or more embodiments, all or a portion of the make-up cooling medium can be introduced via line 190 to the recycled cooling medium in line 180 and/or 120. Although not shown in the FIGURE, at least a portion of the cooling medium recycled via line 120 can pass through one or more treatment and/or purification systems to remove one or more contaminants including, but not limited to, accumulated solids, hydrocarbons, metals, dissolved salts, mixtures thereof, derivatives thereof, or any combination thereof.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A system for pelletizing the hot asphaltene, comprising:
   means for dispersing an asphaltenic hydrocarbon adapted to disperse molten asphaltenic particles at a temperature of from about 175° C. to about 430° C. to provide two or more asphaltenic particles;
   means for pre-cooling the two or more asphaltenic particles, wherein the pre-cooling comprises passing the two or more asphaltenic particles through a mist of a cooling medium prior to contacting the two or more asphaltenic particles with a film of the cooling medium;
   means for cooling at least a portion of the two or more asphaltenic particles using the film of cooling medium to provide two or more cooled asphaltenic particles, the film comprising a thickness of from about 1 mm to about 500 mm; and means for separating the two or more cooled asphaltenic particles from at least a portion of the cooling medium, wherein the means for cooling comprises the film disposed on an interior surface of an inverted cone having a top end and an open bottom end.

2. The system of claim 1, further comprising means for recycling at least a portion of the film of cooling medium to form the cooling medium film.

3. The system of claim 1, further comprising means for recycling at least a portion of the cooling medium; and means for adjusting a temperature of the film of cooling medium to provide the film of cooling medium at a temperature of from about 0° C. to about 95° C.

4. The system of claim 1, further comprising means for recycling at least a portion of the film of cooling medium separated from the two or more cooled asphaltenic particles to provide at least a portion of the film cooling medium.

5. The system of claim 1, further comprising:
   means for recycling at least a portion of the film of cooling medium separated from the two or more cooled asphaltenic particles to provide at least a portion of the film of cooling medium; and
   means for adjusting the temperature of the recycled film of cooling medium to provide a film of cooling medium comprising a temperature of from about 0° C. to about 95° C.

6. The system of claim 1, wherein the means for dispersing an asphaltenic hydrocarbon comprises a distributor having one or more rotating heads each having one or more orifices having a diameter ranging from about 0.5 mm to about 50 mm.

7. The system of claim 1, wherein the two or more asphaltenic particles have a diameter ranging from about 0.1 mm to about 12.7 mm.

8. The system of claim 1, wherein the film of cooling medium comprises water, brine, $C_5$ to $C_9$ alkane hydrocarbons, or a mixture thereof.

9. The system of claim 1, wherein the film of cooling medium has a temperature of from about 0° C. to about 95° C.

10. The system of claim 1, further comprising a means for adjusting a temperature of the film cooling medium in order that the two or more asphaltenic particles cool at a rate of about 1° C./sec to 100° C./sec.

11. The system of claim 1, further comprising a means for adjusting a flow rate of the film of cooling medium in order that the two or more asphaltenic particles are in contact with the film of cooling medium for about 0.1 seconds to about 90 seconds.

12. The system of claim 1, wherein the asphaltenic particles each have a diameter ranging from about 0.5 mm to about 50 mm before cooling.

13. The system of claim 12, wherein the cooled asphaltenic particles each have a diameter ranging from about 0.5 mm to about 50 mm.

14. A system for pelletizing hot asphaltenes, comprising:
- an asphaltenic particle distributor comprising one or more orifices adapted to disperse molten asphaltenic particles at a temperature of about 175° C. to about 430° C.;
- a liquid film comprising a cooling medium, the liquid film having a thickness of about 1 mm to about 500 mm, wherein the liquid film is disposed on an interior surface of an inverted cone having a top end and an open bottom end;
- one or more fluid distributors to provide a mist of cooling medium intermediate the asphaltenic particle distributor and the liquid film; and
- a separator adapted to receive the liquid film containing cooled asphaltenic particles.

15. The system of claim 14, wherein the asphaltenic particle distributor is centrally disposed proximate the top end and projects the molten asphaltenic particles into the mist of cooling medium toward the liquid film.

16. The system of claim 14, wherein the separator is centrally disposed below the open bottom end of the inverted cone.

17. The system of claim 14, further comprising a reservoir fluidly coupled to the separator and the one or more fluid distributors.

18. A system for pelletizing hot asphaltenes, comprising:
- an asphaltenic particle distributor comprising one or more orifices adapted to disperse molten asphaltenic particles at a temperature of about 175° C. to about 430° C.;
- a liquid film comprising a cooling medium flowing along a surface that is at least partially disposed below the asphaltenic particle distributor, the surface comprising an interior surface of an inverted cone having a top end and an open bottom end, and the film comprising a thickness of about 1 mm to about 500 mm;
- one or more fluid distributors to dispense the film of cooling medium and to provide a mist comprising a portion of the liquid cooling medium intermediate the asphaltenic particle distributor and the liquid film;
- a separator adapted to receive the film of cooling medium containing cooled asphaltenic particles from the open bottom end of the inverted cone, the separator comprising a slurry line fluidly coupled to the separator and adapted to remove the cooled asphaltenic particles from the separator and a fluid line adapted to remove cooling medium from the separator; and
- a reservoir fluidly coupled to the fluid line and a recycle line fluidly coupled to the reservoir and the one or more fluid distributors.

19. The system of claim 18, wherein the asphaltenic particle distributor is centrally disposed proximate the top end and projects the molten asphaltenic particles into the mist of liquid cooling medium, wherein the separator is centrally disposed below the open bottom end of the inverted cone.

* * * * *